(12) United States Patent
Grata

(10) Patent No.: US 12,188,846 B2
(45) Date of Patent: Jan. 7, 2025

(54) DEVICE TO CAPTURE HIGH RESOLUTION IMAGES OF THE UNDERCARRIAGE OF A FREIGHT CAR

(71) Applicant: Jeremy Grata, Jacksonville, FL (US)

(72) Inventor: Jeremy Grata, Jacksonville, FL (US)

( * ) Notice: Subject to any disclaimer, the term of this patent is extended or adjusted under 35 U.S.C. 154(b) by 274 days.

(21) Appl. No.: 17/878,162

(22) Filed: Aug. 1, 2022

(65) Prior Publication Data

US 2024/0035931 A1 Feb. 1, 2024

Related U.S. Application Data

(63) Continuation-in-part of application No. 17/326,427, filed on May 21, 2021, now abandoned.

(51) Int. Cl.
| | |
|---|---|
| *G01M 17/10* | (2006.01) |
| *B61L 27/57* | (2022.01) |
| *B61L 27/60* | (2022.01) |
| *G06T 7/00* | (2017.01) |

(52) U.S. Cl.
CPC .......... *G01M 17/10* (2013.01); *B61L 27/57* (2022.01); *B61L 27/60* (2022.01); *G06T 7/0004* (2013.01)

(58) Field of Classification Search
CPC .................................................... G01M 17/08
See application file for complete search history.

(56) References Cited

U.S. PATENT DOCUMENTS

| | | | |
|---|---|---|---|
| 138,405 A | 4/1873 | Janney | |
| 594,059 A | 11/1897 | Beard | |
| 624,901 A | 5/1899 | Beard | |
| 7,328,871 B2 * | 2/2008 | Mace | B61L 1/16 246/169 R |
| 8,925,873 B2 * | 1/2015 | Gamache | B61K 9/12 356/3.01 |
| 9,099,524 B2 * | 8/2015 | Makita | H01L 24/75 |
| 2019/0260972 A1 * | 8/2019 | Behety | H04N 23/695 |
| 2022/0377251 A1 * | 11/2022 | Grata | H04N 23/51 |

* cited by examiner

*Primary Examiner* — Erika J. Villaluna
(74) *Attorney, Agent, or Firm* — Lawrence J. Gibney, Jr.

(57) ABSTRACT

A plurality of modules housed in a chassis is secured to the railroad tie to capture high resolution images of the underside of a train car as it passes over the plurality of cameras. These images are important to insure the structural integrity of the parts of the rail car as well as the connection means—a coupler and pin—between two rail cars. The cameras are configured to capture at a predetermined rate or to operate in sync with the velocity of the train as measured by the Linear Speed Sensor. As the images are taken, the images can be downloaded and sent to a remote location for further analysis.

6 Claims, 6 Drawing Sheets

DEVICE TO CAPTURE HIGH RESOLUTION IMAGES OF THE UNDERCARRIAGE OF A FREIGHT CAR

CROSS REFERENCE TO RELATED APPLICATIONS—CLAIM OF PRIORITY

The applicants are filing this continuation in part and are claiming priority from the previously filed application that was filed on May 21, 2021 with the associated Ser. No. 17,326,427.

FIELD OF THE INVENTION

Trains crisscross the county and are used to transport goods. Trains are comprised of multiple cars and travel on designated routes over tracks. The cars are joined together using couplers; there are many types of couplers in use for this means of transport. It is important for the safe transport of trains that the cars remain coupled. If there is a failure of the coupler and the train cars separate, the train could derail and cause serious personal injury or property damage.

It is important to evaluate the integrity of the coupler system while the train is moving and other components of the train car. The current application positions a plurality of cameras on the tracks; these cameras will take high speed images of the underside of the train car. The placement of the cameras will focus on taking high resolution images of the coupler system between the train cars on the train and other structural components of the underside of each individual freight car.

Freight Trains consist of individual freight cars interconnected by a coupler system. All coupler systems use a pin to connect the coupler to the car. These pins utilize various retainment methods to ensure the continuous operation of the coupler system. Failure of this coupler system, specifically the pin and or pin retainment method will result in train separation and worst-case a derailment.

While there are many types of couplers in use, a specific coupler type known as the F type, positions this pin on the underside of the car. There is a retainer system that resembles the letter "F" which captures the Pin with the addition of a cotter pins and Pin securement device.

In order to inspect the F-pin, as required by the Federal Railroad Administration at periodic intervals, the train would be stationary and an individual would manually inspect each pin and retainment device by positioning themselves under the train to view the device. This application allows images of the car undercarriage components, including the coupler system, to be taken while the train travels at full speed. Images are stored for a period to allow for an intelligence, human or artificial, to evaluate for any defects.

PRIOR ART

There is prior art that uses multiple cameras to take images from multiple views and a representative example can be found at Buibas, U.S. Pat. No. 10,282,852. This reference is used to track an individual in a store and multiple cameras are placed in the store to track the individual. While this application also uses multiple cameras, the cameras in this application are designed to take high speed images of the undersigned of a rapidly moving objects i.e. moving train cars.

Another example of the prior art can be found at Schofield, US Patent Publication 2017/0237946 which is a cabin monitoring system. This application tracks the movement of an occupant inside a vehicle. While multiple cameras are used in this instance, this application does not employ a plurality of lights that are activated at certain predetermined times.

Another example in the prior art that monitors the condition of train tracks using sensors can be found at Singh, U.S. Pat. No. 10,518,791. This device is not designed to take images of the underside of a moving train.

While there are other prior art references, none of the references teach the multiple features that are found in this application.

BRIEF SUMMARY OF THE INVENTION

This application positions cameras and illumination elements known as modules in a predetermined fashion and at predetermined angles. The modules are engineered to support a range of environmental conditions as well as manage internal thermal requirements from the illumination elements. The system is designed to operate during precipitation events though conditions may impact image quality. The system is recommended to operate under a canopy to reduce the impacts of precipitation and solar illumination interference.

In the railroad industry it is imperative that the structural integrity of the underside of the freight train is maintained. While the device captures images of the integrity of hoses and other connections, it is especially important to capture the images of the F-pin and its securement means.

Railroad cars are coupled together using a coupler; a coupler is used between each railroad car. On one end of the coupler is a knuckle assembly that extends from the train and mates with a corresponding knuckle coupler on the car adjacent to the train car. On the opposite end from the knuckle of the coupler is an opening on the truck assembly; the F-pin is inserted into this opening and is secured to the underside of the train car. A retainment mechanism is placed near the opening for the F-pin to ensure that the F-pin remains in place during normal operation of the train. If the F-pin fails or is dislodged, the train cars will decouple.

During normal operation of the train the F-pin and its retainment mechanism is hidden from view by other components of the train. It is, however, visible from the side of the underside of the train. The cameras are placed to provide a mechanism to capture the images of the F-pin by positioning the cameras to capture the views of the F-Pin.

All the modules are equipped with LED light that surround the lens. There are six LED lights, and they were placed as close to the camera lens to eliminate shadowing. The LEDs however produce a great amount of heat and that was one of the considerations when the placement of the LED was being considered.

There is a total of eight modules arranged on two chassis of the same design. The two chassis are arranged to face each other and each mount to a single rail tie. Each of the Chassis are protected by a skid plate and deflector at the rear.

There are four modules on each chassis. Each module is arranged upward at a predetermined angle relative to the top of rail. The four modules are positioned in the same plane adjacent to each other but are angled such as the inner cameras are arranged outward at a predetermined angle relative to the track centerline and the outer cameras are arranged inward at a predetermined angle relative to the track centerline.

The system is operated by a software control system to activate the illumination and activate the capture of images by the cameras. The current application employs technology that is in use to determine the speed of a moving train. The system can be configured to capture images proportionally with the speed of the train or operate in a condition known as "Free Run" where a pre-determined capture rate is established.

The position of the two chassis, established orientation of the modules within the chassis, and the configuration of LEDS with respect to the camera lens are specific to capture images of the F-Pin and F-pin retainment devices. In addition, this configuration provides the ability to capture images of various undercarriage components of a passing freight car.

NUMBERING REFERENCES

Figure 1:
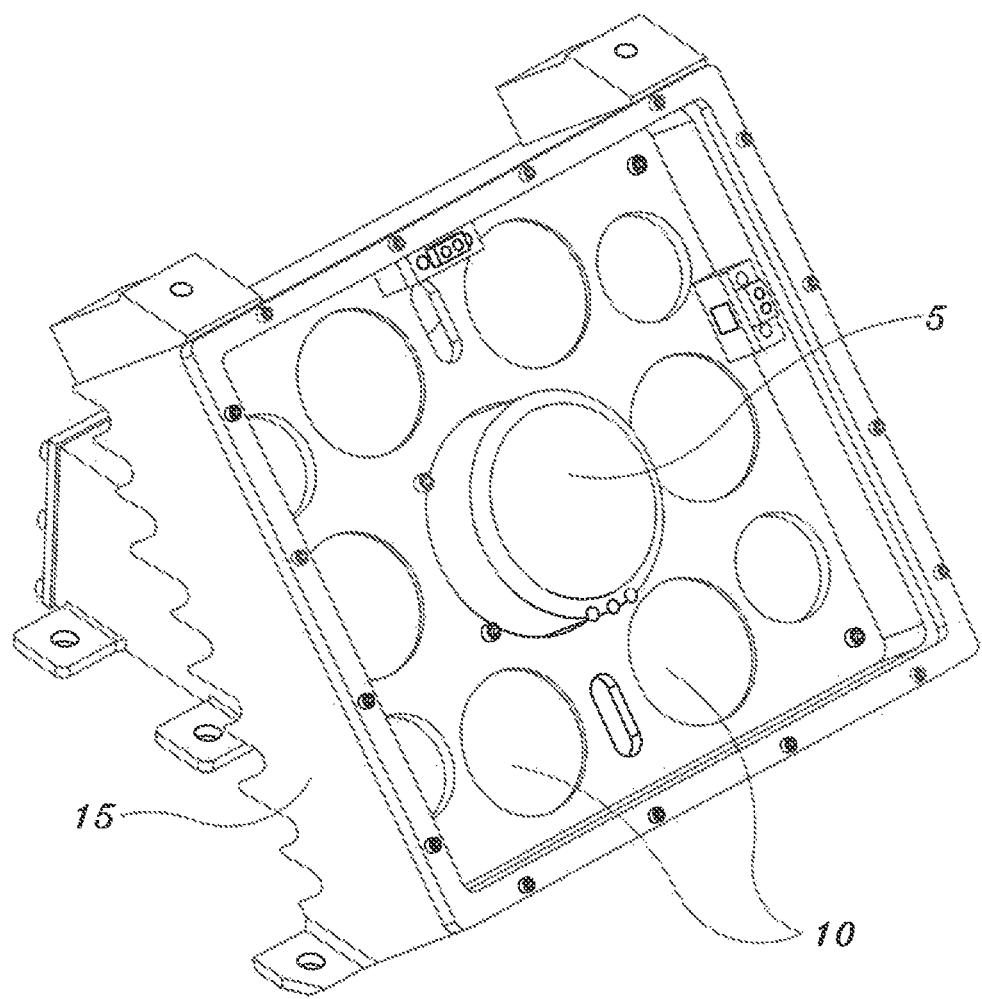
FIG. 1 is a perspective view of the Module Camera and LED

5 Camera
10 LED lights
15 Module
20 Chassis
21 Left Outer Module
22 Left Inner Module
23 Right Inner Module
24 Right Outer Module
25 Shields
30 Rails
50 Freight Car
55 Coupler
60 Retaining Cage
65 F Pin
70 Wheel
75 Retaining Pin

DETAILED DESCRIPTION OF THE EMBODIMENTS

This device uses a configuration of Cameras 5 and LEDs 10 identified as a Module 15. A certain predetermined number of LED lights 10 are arranged in a ring configuration around the Camera 5 to produce sufficient light for the camera 5 to take high resolution images while the train is at full speed, particularly to capture the images of the F-pin 65 and its retaining cage 60 and retaining pin 75. The LEDs 10 configuration is arranged to be parallel with the Camera lens to provide broad even light across the target and reduce shadows at the same time. The importance of the integrity of the F-pin 65 and its retaining cage 60 and retaining pin 75 cannot be overstated. The F-pin 65 is responsible for keeping the individual train cars connected; if the retaining cage 60 and retaining pin 75 fall from the train the train cars 50 will become disconnected. The F-pin 65 and its supporting structure are not being claimed as part of this device.

These Cameras 5 operate at a predetermined exposure to take high resolution images of the underside of the individual freight cars while traveling at full speed. The cameras 5 can be configured to operate at a pre-determined frame or shutter speed rate or they can be configured to be triggered externally to capture the appropriate image in what is commonly referred to as a "free run" status.

Figure 2:
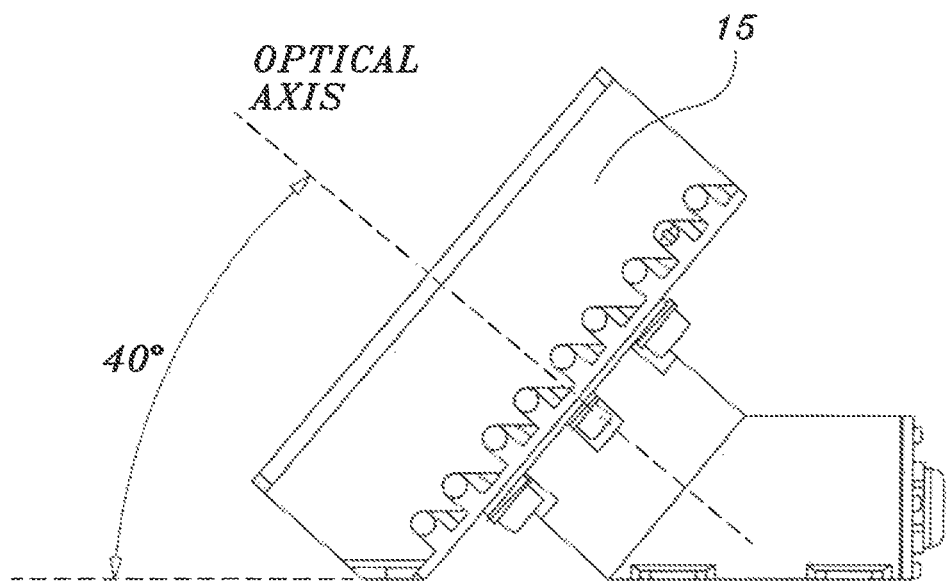
FIG. 2 is a side view of the Module

The Module 15 is engineered to support the elevation pose, environmental, and connection requirements of the system. Primarily the Module 15 is designed to support the Camera 5 pose elevation angle of 40° (forty degrees) relative to the horizontal plane, as shown in FIG. 2; the range of angle may be between 35 and 45 degrees. At the Camera 5 pose elevation the Module 15 is engineered to maintain an overall height less than the height of the rail to prevent damage to the system. The Module 15 supports internal and external thermal management to maintain proper operating temperature of the Camera 5 in ambient conditions from −40° C. to 40° C. Additional environmental requirements are considered in material selections and to ensure that water or moisture ingress is mitigated. The Module integrates electrical and control cables to the Camera 5 and LEDs 10 through appropriately sized cables penetrating the Module 15 through cable glands.

Figure 3:
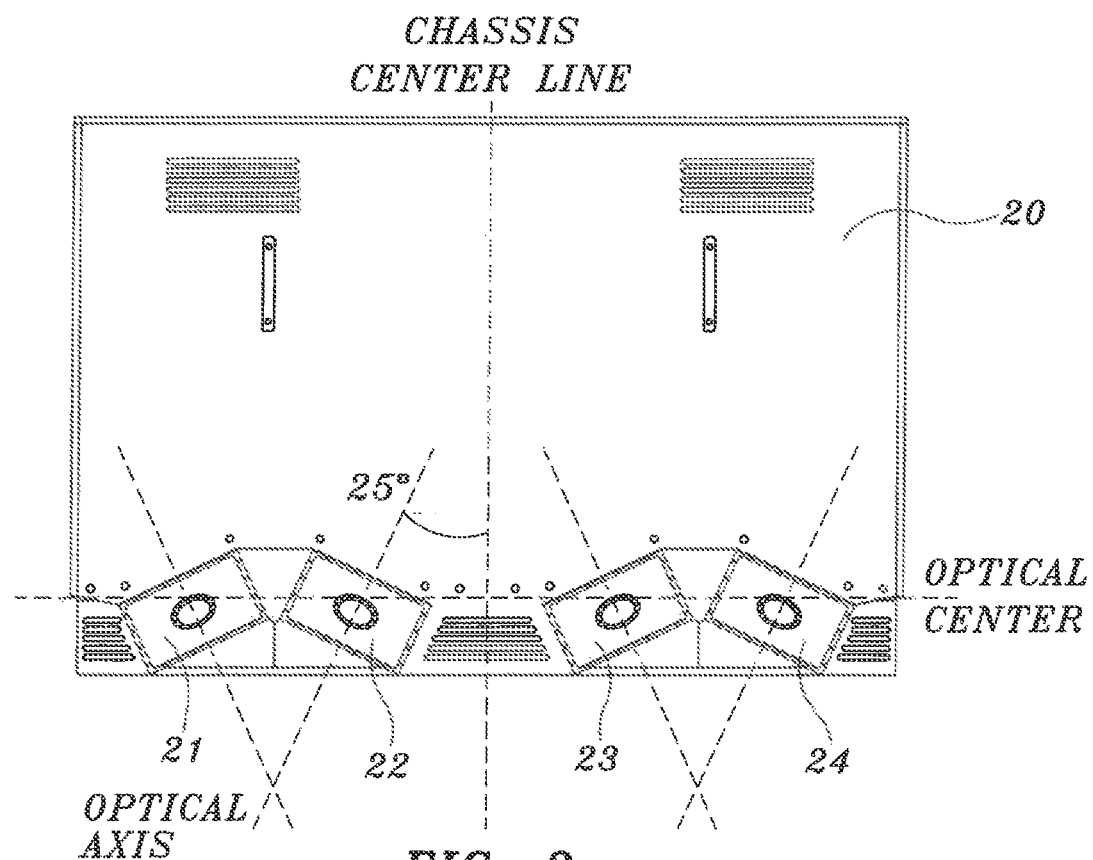
FIG. 3 is a top view of the Chassis denoting the chassis center line and relative positions of the modules relative to the chassis center line

There are four Modules 15 mounted to a Chassis 20 using standard threaded fasteners. The Modules 15 are identified on the Chassis 20 by location from chassis centerline. FIG. 3 depicts the Chassis 20 in a top view with the Modules 15 facing down describing Left and Right with the position relative to centerline. In this orientation the Modules 15 are identified as Left Outer Module 21, Left Inner Module 22, Right Inner Module 23, and Right Outer Module 24.

In addition, FIG. 3 depicts the Modules 15 position so the optical entrance of each Camera 5 is co-linear with the adjacent Module 15. The modules are oriented on the Chassis 20 such that each Module 15 is at an angle of 25° relative to the Chassis centerline as depicted in FIG. 3. The Left Outer Module 21 and Right Inner Module 23 are oriented parallel to each other with the 25° angle directed to the Right side of FIG. 3. The Left Inner Module 22 and the Right Outer Module 24 are oriented parallel to each other with the 25° angle directed to the Left Side of FIG. 3.

A Chassis 20 is mounted to a single rail tie. The Chassis 20 is secured to the rail tie using a configuration of chain tie downs which secure under the rail tie and are tightened using a threaded rod. Additionally, each chassis can be attached with lag bolts into wooden rail ties or with machined bolts into a metal hollow tie with matching threaded holes.

Figure 4:
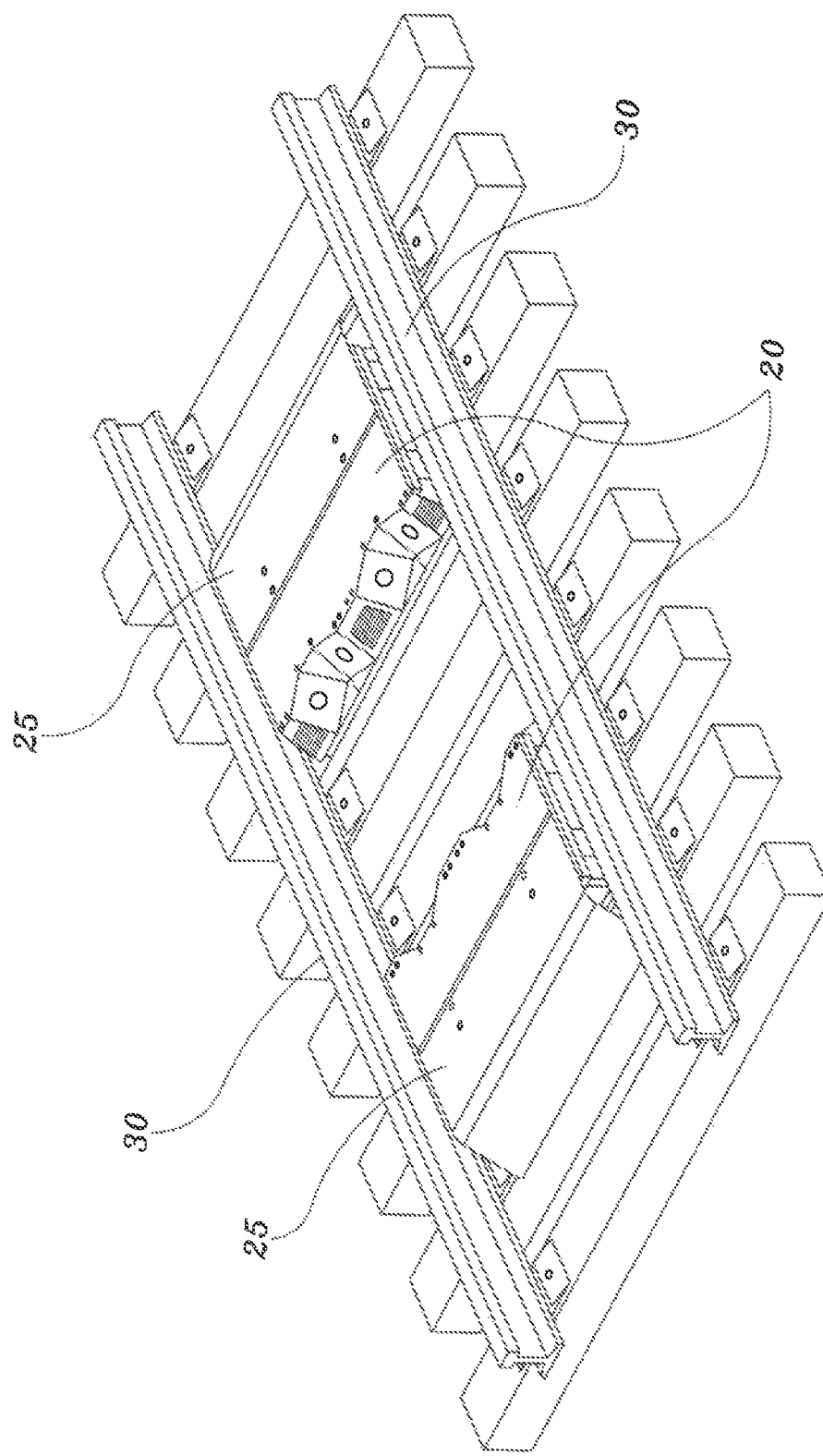
FIG. 4 is an installed view of the device installed on the railroad track
Figure 5:
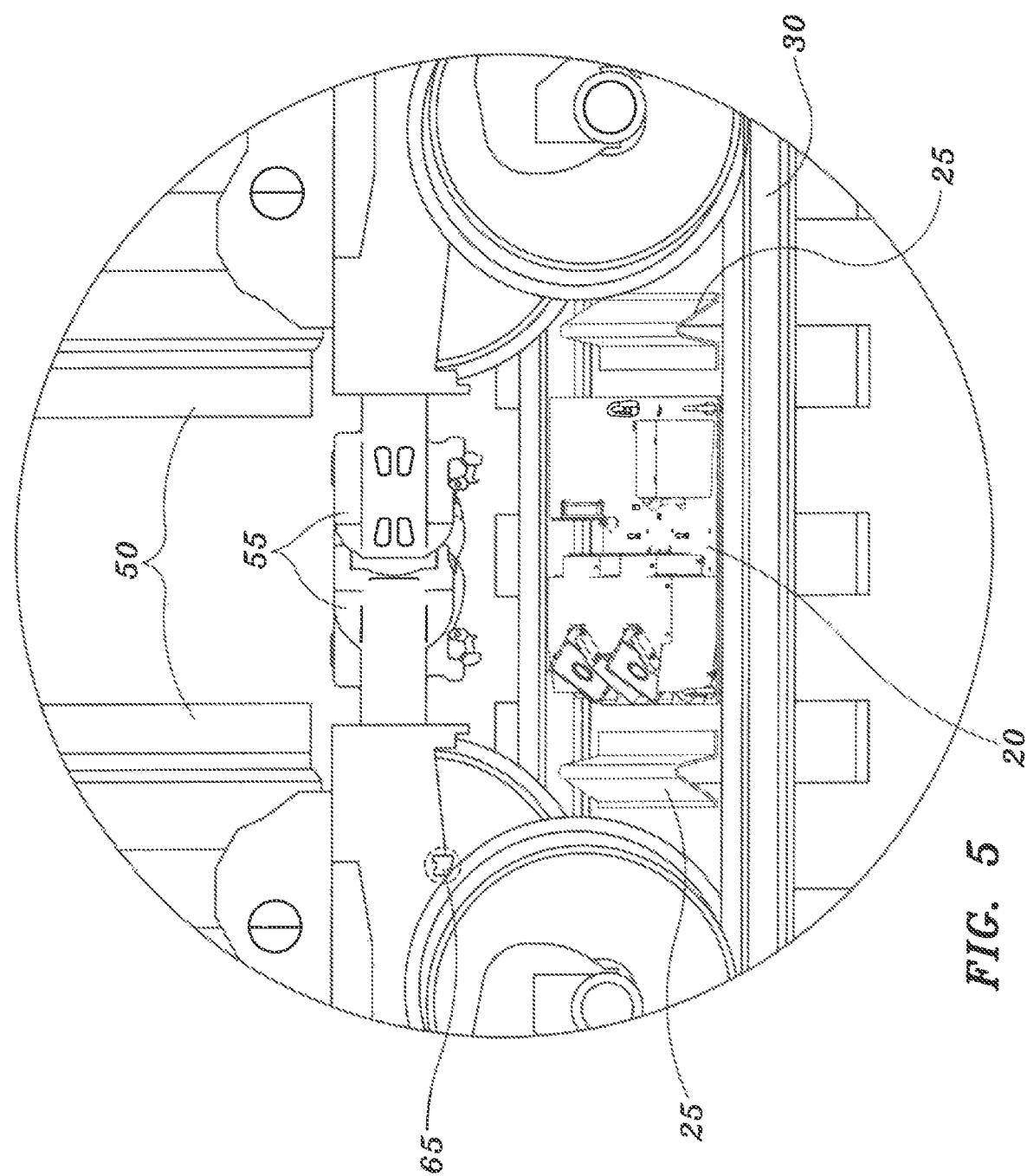
FIG. 5 is an in-use view of the device on the track with a train car passing over the device
Figure 6:
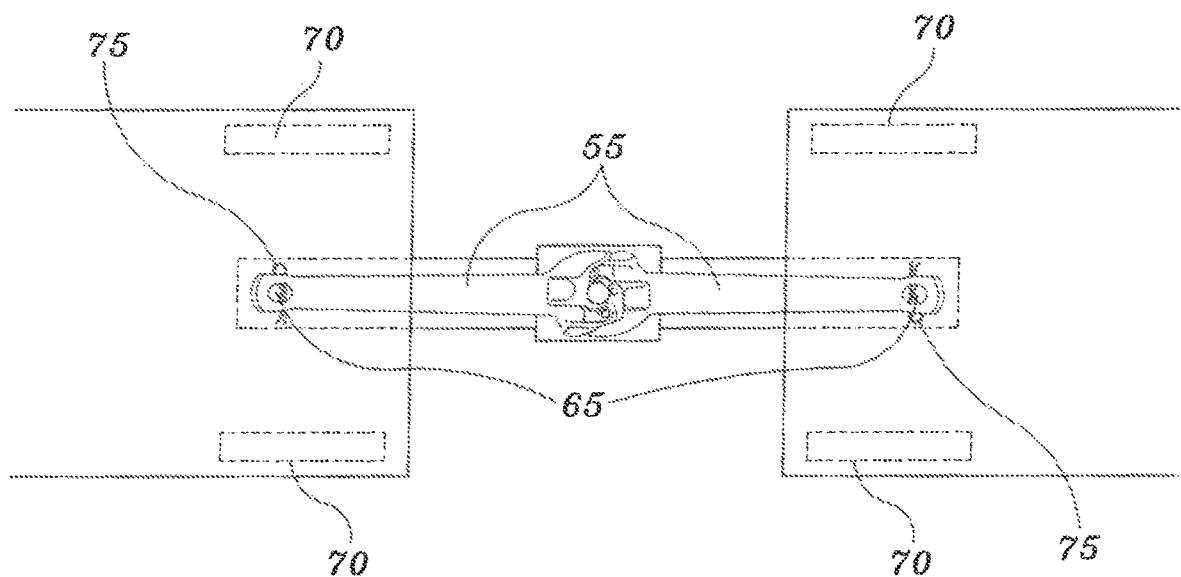
FIG. 6 is a top view of the train car depicting the position of the F-pin
Figure 7:
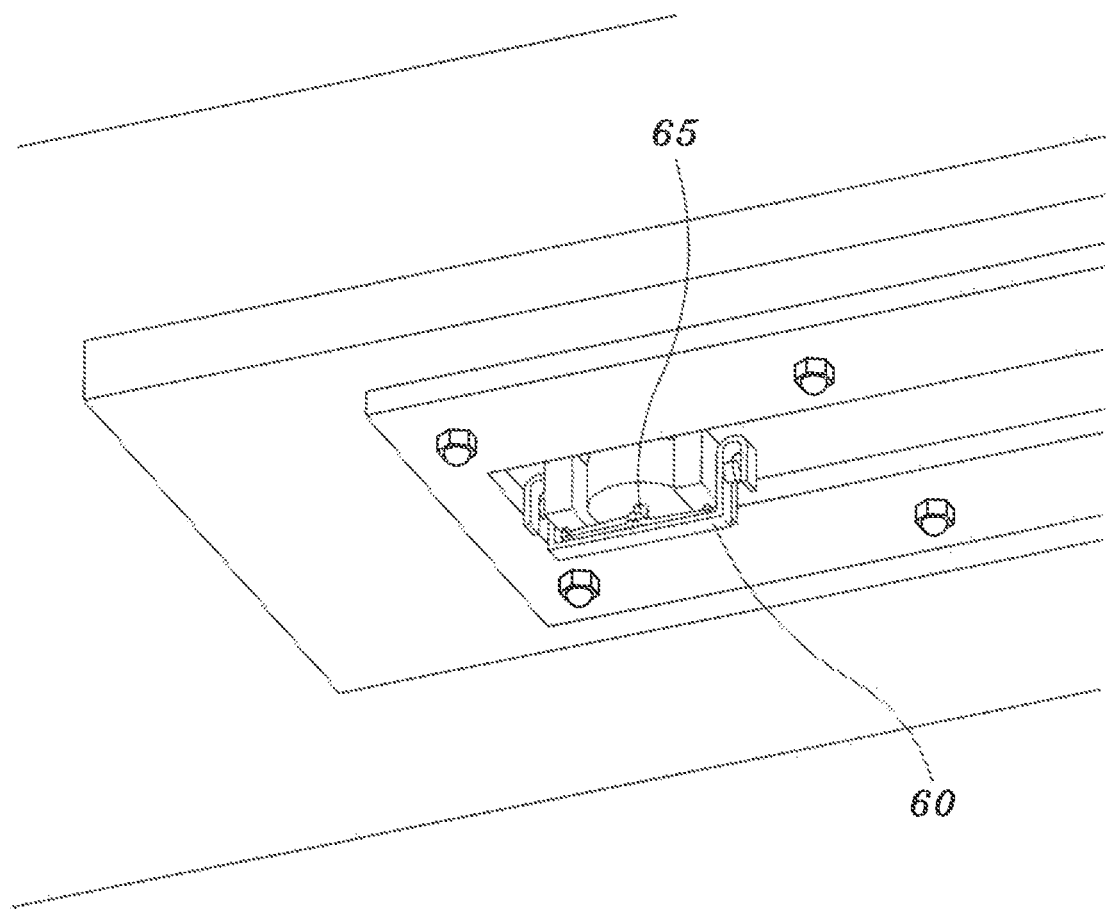
FIG. 7 is a perspective view of the specific F-pin and retaining cage

A typical installation will include a total of two Chassis 20 to be installed on the same track, See FIG. 4. The Chassis 20 are oriented to have the Modules 15 facing each other. Cables are run to the rear of each Chassis 20 to control panels mounted outside the track, within 50 feet of the Chassis 20. A Shield 25 is installed to cover the rear cable access and provide additional protection to the Chassis 20. An additional deflector can be added for additional protection.

The variety of freight rail cars may present different equipment that may occlude the F-pin 65 and F-pin retaining cage 60 from any one camera 5 image; the retaining cage 60 is kept in position by the retaining pin 75. The configuration described above allows multiple angles to ensure the F-pin 65 and F-pin retaining cage 60 and retaining pin 75 are appropriately imaged and able to be identified. In addition, each Camera 5 is controlled in such a manner to allow multiple discrete images to be captured. The rate of image capture can be configured to be predetermined or operate in sync with the velocity of the train as measured by the Linear Speed Sensor software, which is software that is used specifically to determine the speed of the train. The cameras capture the images and transmit the images to processing software that can gather the images and transmit the images to a remote location.

The components of this system are designed to withstand extreme environmental condition including a temperature range between negative 40 degrees Celsius and positive 40 degrees Celsius.

The captured images from each Camera 5 are transmitted via a wired connection to a series of acquisition devices. The acquisition devices and associated processing software log and integrate the images into a storage medium for future access and review.

I claim:

1. A device to capture high resolution images of an F-pin and an F-pin retaining cage and other features on the underside of a freight train, which is comprised of:
   a plurality of modules;
   each module houses a camera lens;
   each module has a camera, wherein an optical entrance of each camera is provided,
   wherein the camera lens is positioned at an angle of forty degrees relative to the horizontal plane;
   said module houses a plurality of LED lights;
   wherein the plurality of LED lights surrounds the camera lens;
   said plurality of LED lights are positioned as a ring around the camera lens;
   a pair of chassis;
   wherein four modules are placed on each of the pair of chassis;
   wherein each of the pair of chassis is secured to a rail tie;
   wherein a plurality of rail ties are placed below a pair of railroad tracks;
   wherein four of the modules on each of the pair of chassis are positioned in a linear arrangement;
   wherein the pair of chassis are mounted below the height of the pair of railroad tracks;
   wherein each module allows the camera to operate in ambient conditions from −40° C. to 40° C.;
   wherein the optical entrances of the cameras on each of the pair of chassis are colinear and permit the capture of images in the direction of travel of the train;
   processing software;
   wherein each chassis is further comprised of a left outer module, left inner module, right inner module and right outer module;
   wherein optical axes of the respective left outer and right inner modules of each chassis are parallel to each other and oriented twenty-five degrees relative to the centerline of the chassis;
   wherein optical axes of the respective left inner and right outer modules of each chassis are parallel to each other and oriented twenty-five degrees relative to the centerline of the chassis;
   wherein the pair of chassis are located with the modules of each chassis facing each other within the same railroad track;
   wherein a configuration of the pair of chassis is protected by metal shields installed on edges opposite of the modules.

2. The device to capture high resolution images of the F-pin and the F-pin retaining cage and other features on the underside of a freight train as described in claim 1 wherein a shutter speed of each of the cameras is set at a predetermined rate.

3. The device to capture high resolution images of the F-pin and F-pin retaining cage and other features on the underside of a freight train as described in claim 1 wherein a shutter speed of the camera is established by a speed of the train.

4. The device to capture high resolution images of the F-pin and F-pin retaining cage and other features on the underside of a freight train as described in claim 1 wherein a range of the camera angle relative to the horizontal plane is between thirty-five and forty-five degrees.

5. The device to capture high resolution images of the F-pin and F-pin retaining cage and other features on the underside of a freight train as described in claim 1 wherein the captured images are transmitted the processing software.

6. The device to capture high resolution images of the F-pin and F-pin retaining cage and other features on the underside of a freight train as described in claim 1 wherein the processing software transmits the images to a remote location.

* * * * *